(12) United States Patent
Dufresne et al.

(10) Patent No.: US 8,307,985 B2
(45) Date of Patent: Nov. 13, 2012

(54) COLOUR SORTING OF CATALYST OR ADSORBENT PARTICLES

(75) Inventors: Pierre Dufresne, Valence (FR); Maxime Meens, Livron sur Drôme (FR); Mickaël Bremaud, St Georges les Baines (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 67 days.

(21) Appl. No.: 12/146,640

(22) Filed: Jun. 26, 2008

(65) Prior Publication Data
US 2009/0000992 A1 Jan. 1, 2009

(30) Foreign Application Priority Data
Jun. 29, 2007 (EP) .................................... 07290822

(51) Int. Cl.
*B07C 5/342* (2006.01)

(52) U.S. Cl. ......................................... 209/11; 209/580

(58) Field of Classification Search .................... 209/11, 209/580
See application file for complete search history.

(56) References Cited

U.S. PATENT DOCUMENTS

| | | | |
|---|---|---|---|
| 1,678,884 A | 7/1928 | Sweet | |
| 2,967,614 A | 1/1961 | Nury et al. | |
| 3,962,403 A | 6/1976 | Wyslouzil | |
| 3,992,287 A | 11/1976 | Rhys | |
| 4,308,146 A * | 12/1981 | Gagle et al. ................... | 210/663 |
| 4,347,125 A | 8/1982 | DiGiacomo | |
| 4,406,773 A * | 9/1983 | Hettinger et al. .......... | 208/120.2 |
| 5,154,819 A * | 10/1992 | Clark et al. ................ | 208/216 R |
| 5,438,028 A * | 8/1995 | Weissman et al. ............. | 502/202 |
| 2003/0130118 A1 * | 7/2003 | Koyama et al. ............... | 502/337 |

FOREIGN PATENT DOCUMENTS
GB      2 188 727 A      10/1987

OTHER PUBLICATIONS

European Search Report and Written Opinion completed Dec. 11, 2007 in European Patent Application No. 07 290 822.1-2307 filed Jun. 29, 2007.

* cited by examiner

*Primary Examiner* — Joseph C Rodriguez
(74) *Attorney, Agent, or Firm* — Millen, White, Zelano & Branigan, P.C.

(57) ABSTRACT

Process for separating at least one type of catalyst or adsorbent particles having similar colors characterized in that such particles undergo an oxidative heating treatment for generating particle of different colors, and then particles are separated using a color sorting process for separating at least one type of particles.

17 Claims, 1 Drawing Sheet

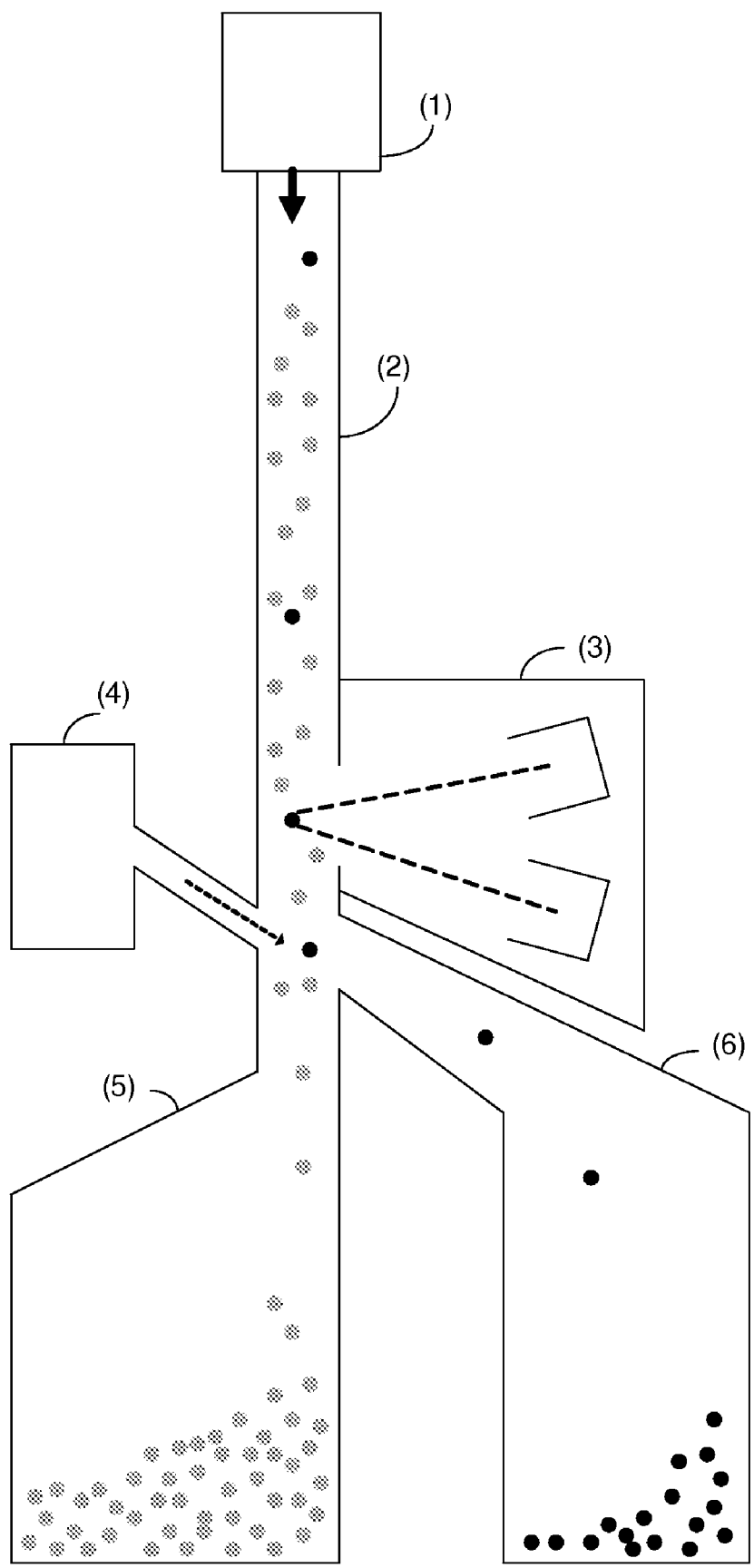

COLOUR SORTING OF CATALYST OR ADSORBENT PARTICLES

FIELD OF THE INVENTION

The invention relates to the separation of catalyst or adsorbent particles, these particles having been submitted to an oxidative heating step, as in regeneration.

It relates specifically to the case where particles of different compositions are mixed, for example during unloading of several beds of used catalysts and a separation is suitable according to compositions.

The invention also applies during regeneration, where particles not completely regenerated are separated from well regenerated particles and recycled to regeneration.

The invention also relates to regeneration where particles have reached such a level of contaminants that they cannot be regenerated, so they are separated and eliminated from the regeneration process.

In the present invention, the term regeneration means an oxidative heating treatment (200-700° C. generally) which allows at least partial elimination of contaminant(s) contained in the used particles of catalyst or adsorbent, said contaminant being carbon (coke), sulfur, etc. The oxidative heating treatment may be included in a series of processes, such as some chemical process(es) or others heat treatments, named as rejuvenation or reactivation. In all these processes, the particles are used catalyst or adsorbent particles which contain carbon. In the text, the terms used, depleted or spent have the same meaning.

Many other applications can use the process according to the invention. In the cited cases above, criteria for separation of particles are not the size or the weight, and the particles to be separated have similar colour. Surprisingly, we found that such particles can be separated using colour criteria if they undergo previously a heating treatment to generate a colour. This implies that at least one type of particles to be separated has the property to change the colour under heating treatment. So, the invention implies the separation of catalyst or adsorbent particles by their colours.

When trying to separate particles such as pills, beads of any kind, for instance cereals, beans, hulls of leguminous plants, rice, coffee, plastic or glass particles and catalyst or adsorbent particles, the separation method can be rather easy if the so called particles have different sizes or different weights (or density). The problem is more complex when the said particles have about the same size or the same weight. More elaborate methods are needed.

In the context of the present invention, a method is given that allows the separation of depleted (spent) catalysts particles or depleted (spent) adsorbent particles, in particular of the same or different weights or sizes, recovered (i) from various reaction zones of catalytic reactors used for the conversion of hydrocarbons, for instance, naphtha reforming, aromatics production, isomerization, polymerisation, hydroprocessing (e.g. hydrotreatment or hydrocracking) and other refinery or petrochemical processes and (ii) from various adsorption zones of adsorption vessels.

The method according to the invention utilizes a "colour sorting" technology that has already been used in the food industry, associated with a thermal treatment for colour generation Spent catalysts or adsorbents unloaded from reactors or vessels where they have been used for the period of a cycle, each cycle lasting for example several months or years, may be a mixture of products of different compositions. In some cases, it is wanted to physically separate those mixtures of products, for purposes of either reuse or recycling.

There are different cases where catalyst or adsorbent particles of different brand or types are mixed, whether on purpose or by accident. It may be desirable to separate those particles in order either for reusing, selectively part of the lot or recycling also selectively another part of the lot.

PRIOR ART

Separation of materials according to their colour (named colour sorting process) is already known, using optical devices. For example EP-873.796 describes a machine for separation of granular materials by their colour, these materials being cereal grains, plastic pellets, coffee beans.

In GB-2188727, separation of ores is performed after microwave irradiation of ores followed by detection and analysis of the heat emission of the particles as well as their sizes, and owing to an appropriate software and apparatus, suitable particles (kimberlite) are separated from non-kimberlitic ores. This result is obtained due to the different content of water of kimberlitic and non-kimberlitic ores which give different responses to microwave irradiation.

SUMMARY OF THE INVENTION

The present invention relates to a process including a treatment able to generate a difference in colour between two particles populations and then an operation of colour sorting for segregating those two populations.

The target of the invention is to separate different streams of catalyst or adsorbent particles each of them having different compositions. The separation by colour, or colour sorting, can be advantageously combined with a treatment prior the sorting step in order to better reveal the difference in colour of the particles mixture.

The invention is thus specifically useful if the particles to separate have the same shape and size.

More precisely, the invention relates to a process for separating at least one type of catalyst or adsorbent particles having similar colours wherein such particles undergo an oxidative heating treatment for generating particles of different colours, and then the particles are separated using a colour sorting process for separating at least one type of particles.

By "having similar colours" it is understood that as treated particles are spent particles with carbon lay down, may show similar colours in the range of grey, dark, brownish . . . assuming such colours could be visually distinguished in some cases. It also means that there is no brightness of some species in the particles, or no visible fluorescence.

The particles undergo an oxidative heating treatment. After this treatment, particles show colours at least sufficiently different to be separated by a colour sorting process, apparatus. This difference in colours is revealed by the removal of carbon. The difference may have been present in the fresh catalyst or adsorbent (before its use in reaction) but hidden by carbon, or it could result from a variation in carbon content after the heat treating step.

In particular, the process allows separation of (heat treated) particles having different carbon contents. Especially the process of the invention allows separation of particles having different carbon contents in the following proportion: the ratio of average carbon content of the flow of particles rich in carbon to average carbon content of the flow of particles poor in carbon is at least 2, preferably at least 3.

Generally, one type of particles has an average carbon content of less than 1% wt (preferably less than 0.5% wt), and can be re-used as a good catalyst or adsorbent. Generally, one type of particles has an average carbon content of more than 2% wt or 3% wt. They can be recycled to regeneration or sent for metals recovery.

For example, one type of separated particles has an average carbon content of at least 5% wt and is sent to metal recovery, and the type of separated particles having an average carbon content less than 1% wt or less than 0.5% wt is re-used.

This process can be used for particles containing carbon which are unloaded from a reactor.

So, the invention allows reaching at least the following objectives:
- separation of non-regenerable particles, considered as waste and sent for metal recovery
- separation of particles not sufficiently regenerated which are recycled to regeneration
- separation of regenerated particles having different compositions
- advantageously, it is a continuous process.

DETAILED DESCRIPTION OF THE INVENTION

Such catalysts or adsorbents involved in this invention contain support or matrix that are either porous i.e. amorphous (amorphous oxides for instance) or of the crystallized type (zeolite for instance, e.g. aluminosilicates). They may contain chemical element(s). Such catalysts may be generally used for instance in a reforming process or a process for the production of aromatics (see for instance U.S. Pat. No. 3,981,824) or also in a refining process such as the treatment of monoolefins or diolefins or acetylenic (i.e. alkenes—see EP1661965, WO20002169346—, alkynes—see GB1283630 for the hydrogenation of acetylene or allenic hydrocarbons—) and also such as the treatment of aromatic hydrocarbons (selective hydrogenations, alkylation—see GB1285807—, transalkylation—see GB1655277 or EP1655277—, dealkylation—see GB1247278—, isomerization of xylenes—see U.S. Pat. No. 6,512,154—) and such as polymerisation, oligomerization (see EP1616846), isomerization of olefins (see WO2002169346) or isomerization of paraffinic hydrocarbons (see EP1417283 and EP1066697), or such as an hydrocracking process (see WO2007003793 or WO2006037885), a cracking process (see EP1656989) or of hydrotreating in general (see U.S. Pat. No. 7,005,059). Various zeolites or molecular sieves based adsorbents are involved as well. Here, particles of same sizes or not are generally used.

Such particles may contain contaminants as carbon (as used coked catalysts), sulphur, etc.

One common cause of catalyst deactivation is the deposit of carbonaceous species in the catalyst porosity, called coke. In some cases this coke lay down may be heterogeneous in the different reactor zones. Then, after catalyst unloading, these zones are mixed altogether and there is a mixture of particles with different carbon content.

One target of the invention allows to separately recovering different streams of catalyst or adsorbent particles each of them containing different percentages of carbon. The separation by colour, or colour sorting, can be advantageously combined with a treatment prior the sorting step in order to generate the difference in colour of the particles mixture.

When the oxidative heating treatment is the regeneration of the particles, it operates generally between 300-700° C., under an oxygen containing gas, usually at atmospheric pressure, and a residence time of several minutes or hours.

The colour sorting process is a process which optically detects the difference of colours and which separates the particles according to colours detected. Optical devices are used, in particular the machine described in EP-873.796.

Another target of the invention is to separate particles of different colours, those various colours being due to different elemental composition. In the case of spent or used catalyst mixtures, all particles may be homogeneously black (covered by layers of carbonaceous species, generally called as coke), preventing any chance to achieve any colour sorting. After a thermal treatment allowing total or partial carbon elimination, discrimination can be done between catalyst particles. This can be applied for instance to a mixture of hydroprocessing catalysts of the CoMo type (Cobalt-Molybdenum, blue colour) and NiMo type (Nickel-Molybdenum, green colour). These mixtures could have been produced by accident.

One example is the unloading of a reactor containing different beds loaded with catalysts of different brands or compositions. In normal operation, each bed is unloaded individually. However it can occur that mixtures are made by accident. Then this catalyst mixture cannot be reused as such and has to be treated as a waste. Even then, for an operation of metals reclaiming, the positive value of the metals can be affected by the fact that the product has been contaminated by another unwanted metal. The invention can bring a solution to this problem. Another target of the invention goes even further. It is said above that these catalyst mixtures of different composition could have been produced by accident. They could also have been produced on purpose. In some reactors, it can be an advantage to load a mixture of CoMo and NiMo catalyst of same dimensions; in other reactors, to load a mixture of NiMo and NiW (Nickel-Tungsten) catalysts. This was not so far the practice as the separation was known to be impossible. Even in the case where the catalyst user does not want to regenerate and reuse the catalyst, it is known that the metals reclaiming of a mixture NiMo/NiW is extremely difficult. So the prior art is to load in separate beds catalysts of different compositions and same shape or diameter. The present invention can change this practice, as the separation can become possible in reasonable economic conditions.

Another target of the invention is the separation of the so-called "heel catalyst" from spent naphtha reforming catalyst (or from spent catalyst in a process for the production of aromatic hydrocarbons). Reforming unit of the CCR type (Continuous Catalytic Regeneration) may contain a catalyst inventory made of a major part of particles contaminated by roughly 5-7% carbon, which is considered as a normal deactivation, and a minor part of heavily coked particles with 10-40% carbon. The presence of this minor part prevents the reuse of the mixture as those heavily coked contaminated particles are considered as non regenerable. So it is desired to separate those two qualities of spent catalyst. They have the same size (beads) and the same aspect. A specific feature of the heavily coked particles is that the graphitic nature of this carbon makes it virtually incombustible in conditions where normal coke is easily removed on the other particles, for instance at a temperature of around 500-560° C. So, after an oxidative thermal treatment, or a conventional regeneration step or reactivation step or rejuvenation step, this treatment or step leads to a mixture of catalyst particles. This mixture can be composed of a population of whitish or light grey particles, containing typically generally less than 1.5 weight % carbon, and of black particles containing typically more than 5 or even more than 10 weight % carbon. The colour sorting can then be successfully applied.

The heating treatment of the invention which allows obtaining particles of different colours, in particular depending of their composition, is carried out at conditions depending on said variation in colour.

This treatment is applied before regeneration if the purpose is to separate particles according to their composition before complete regeneration or before any other treatment. This treatment can be regeneration itself if it leads to colours depending on compositions.

In an embodiment of the invention (ex 2) a control of the regenerability of the catalyst or adsorbent becomes possible. That means that the process allows an easy and economical elimination of non regenerable particles containing roughly more than 15% wt carbon, the difference of colours being due to the difference in composition of carbon deposited.

In another embodiment (ex 3), the regeneration level can be controlled, whether the regeneration has been completed or not, the non completely regenerated particles being recycled, the regeneration being generally considered sufficient when the average content of carbon in the flow of particles is less than 5% wt, preferably less than 1% wt, or even less than 0.5% wt.

In another embodiment where particles are completely regenerated, the colour being due to the difference of composition of the particles themselves (not due to the difference of composition in carbon), the invention allows separation of types of particles according to said difference in composition.

According to the present invention, the appropriate apparatus to sort particles by colours is a device such as a colour sorting device or machine. Such device uses colour detection by means of cameras and ejection of different product streams according to their colours. This device or machine is well known in the art. It can allow for instance the separation, i.e. the sorting, of various kinds of particles, such as rice, coffee, peanuts, tree-nuts, beans, grains, seeds, as well as snack-foods, confectionery, breakfast cereals and even plastics such as recycled plastic, glass particles, minerals rocks and stones, and so on.

The concept of the Colour Sorting device or machine is presented in FIG. 1. The machine is made of different pieces: an inlet hopper (1), a tube (2) where the particles fall in front of optical cameras (3), an ejection device (4) by means of compressed air, a receptacle (5) for the main product stream and another one (6) for the rejected product.

The cameras are able to differentiate particles of different colours and then give a signal to the ejection device for eliminating selectively some particles of different colours. They can use CCD (Charge-Coupled Device) detectors in the visible or infrared wavelength zone. They must have the highest resolution and the lowest signal to noise ratio to detect and then sort different particles according to their colours. The simplest machines are monochromatic, i.e. using only one wavelength. Then the intensity of the light reflected by the particle appears more or less bright or dark, allowing the detector to identify, and then accept or reject, the particles. More sophisticated machines are bi-chromatic versions, allowing discriminating particles by wavelength and by intensity.

As previously mentioned and further illustrated, according to the invention, in the field of catalysis or in the field of adsorption, three various concepts can be interesting for those skilled in the art and will be explained here below as non limitative examples:

New ways for catalysts loadings.

Separation of heel catalyst from a spent reforming catalyst.

Carbon burn-off rate optimisation.

The steps of the process according to the invention can be optionally implemented in combination with a well known step such as a sorting by means of length or density, procedures described in the prior art.

The process according to the invention may be used for the treating of a mixture containing catalyst particles and adsorbent particles.

It is understood in this text that colour is meant here in the broad sense, i.e. black, white and intermediate greys are included in the definition of different colours. In some examples, it is clear that the application of the invention covers various catalysts of the same type, even of same brand, which have been more or less decarbonised, and thus which may have different nuances of colour from white to grey and black.

So, the invention can be applied to any catalyst or adsorbent particles having the property to change their colour by heating treatment, due to their compositions.

EXAMPLES

Example 1

New Ways for Catalysts Loadings (a) General

In a first concept of the invention, the process of the invention is implemented in a method involving new ways for catalysts loading.

In this first kind or concept of application, various streams of spent catalysts particles are successfully recovered from a colour sorting machine wherein a mixture of those various catalyst particles had been sent irregardless of their chemical composition, after having been submitted to (or regenerated by) an oxidative thermal treatment.

This concept particularly applies to the separation of hydrotreatment catalysts that contain supported or unsupported metals or metal oxides such as Molybdenum, Tungsten, Cobalt, and Nickel. Such hydrotreatment catalysts are described for instance in EP-A-1393802 or U.S. Pat. No. 64,447,671.

Many hydrotreatment units of hydrocarbon streams are loaded nowadays with different catalyst brands for optimizing the reactions goals of for instance either Sulfur and Nitrogen removal and aromatics hydrogenation. The common practice is to load those different catalysts types in different zones, either different reactors or different beds of same reactor, for allowing separate unloading of these different products. Another possibility is to load them in the same bed of the same reactor in different layers, but then with different sizes (or shapes) so that a sieving could easily separate the mixture later on. A limit of this last solution is that the particles of higher diameter are usually less active than the small diameter particles. So it could be advantageous to load in the same beds particles of different types but same size in the same beds of same reactors. This is now possible with the invention, provided that those different catalyst types are different in colour. A first step of oxidative regeneration is necessary to remove the coke lay down and reveal the original colour of the fresh material.

(b) Technical Data

In the present example, a lot of spent catalyst of 10.9 tons was received. It was made of catalyst particles of quadrilobe shape of diameter 1.3 mm. The average carbon content of the mixture is 11.4 wt % C and the colour is homogenously black. The regeneration of a representative sample of the lot at laboratory scale reveals that it is made of a mixture of green and blue particles, so Nickel Molybdenum and Cobalt Molybdenum catalyst, approximately 15% by count of green particles and 85% of blue ones. Such a mixture cannot be reused as such and thus has no value, except the low positive value of its metallic content. It was thus decided to apply the series of treatment of regeneration and colour sorting.

The mixture has been regenerated in a rotolouvre furnace at an average rate of 400 kg/h, to reach a carbon content of 0.4% wt. After fines removal by sieving, the catalyst quantity was 8730 kg.

The regenerated mixture was then sorted using a colour sorting device or machine from SORTEX BUHLER, the Sortex Z+ bichromatic model. The machine (as already described hereabove) is composed (see the drawing) of an inlet hopper (1), then a zone (chute tube) (2) where the particles fall in front of one or several optical cameras (3), an ejection device (4) by means of compressed air (not shown on the drawing), a receptacle (5) for the main product and another one (6) for the rejected product. The cameras are able to recognise the green particles in the flow of a majority of blue particles and give a signal to the ejection device for eliminating selectively those black particles.

During this colour sorting trial, the flow rate was 40 kg/h. 970 kg of NiMo particles was separated on one side and 7750 kg on CoMo particles on the other side. The NiMo part contains approximately 2% by weight of CoMo, and the CoMo part contains 4% by weight of NiMo.

Those 2 streams are good enough to be reused in a hydrotreatment service. This example demonstrates that the colour sorting allows separating catalyst of different chemical composition, provided that the fresh or regenerated material have different colour. In this example the mixture was made accidentally during the reactor unloading of different beds. But, because of the new possibility offered by the invention, a mixture can be made on purpose for optimizing Hydrotreating unit performance.

Example 2

Method for the Separation of Heel Portion from a CCR Naphtha Reforming Catalyst or the Like (a) General In a second concept of the invention, the process of the invention is implemented in a method for the separation of heel portion from a CCR naphtha reforming catalyst. In this second concept, the case of a spent CCR (continuous catalyst regeneration) reforming catalyst (or of a spent catalyst in a process for the production of aromatic hydrocarbons, this process being very similar to a reforming process), is concerned.

Generally these catalysts comprise an alumina support, at least one noble metal from the family of platinum, and contain as well an halogen such as chlorine (see for instance GB 2228426 or U.S. Pat. No. 3,981,824). Catalyst circulates from the reaction zone to the regeneration zone, where carbon lay down is burnt off and where the metallic phase is redispersed in order to get a product as active than fresh (as described for instance in EP-A-710502). Catalyst shape is usually spherical. One common troubleshooting case of those units is that a small part of the catalyst does not circulate properly and remains stuck in some part of the reaction zone. It can accumulate coke up to 30 or 40 wt % and becomes totally inactive for the reforming reactions. This is the so-called "heel" catalyst. From time to time, the CCR reforming unit has to be unloaded from the whole catalyst inventory and then the spent catalyst is made of a mixture of potentially good catalyst, containing around 5-7 wt % carbon and the "heel" portion with carbon content often higher than 15 or 20 wt %. The carbon of this "heel" catalyst has a pronounced graphitic nature and thus is virtually impossible to remove by conventional regeneration conditions. It is generally admitted that such a mixture cannot be reused in a reforming process or in a process for the production of aromatic hydrocarbons, if the heel portion is higher than 2%.

Hence according to our second concept of the invention, we use a series of two treatments: regeneration and colour sorting. We use conventional regeneration conditions, allowing the carbon to be removed from the main catalyst stream, which then become white or light grey, while the heel portion remains shiny black. Then the colour sorting device or machine allows separating the two qualities. On one side of the machine a major part of white particles can be obtained, the carbon content of each particle being less than 1.5 wt % carbon, preferably less than 1.3% or even less than 1 wt %. These recovered particles may be re used in a reaction zone. On the other side of the machine a minor part of black catalyst particles will be recovered, the coke content of each particle being higher than 5% by weight and generally comprised between 5 and 30% by weight. These irrecoverable particles are of no more use and can be discarded for platinum metal recovery.

(b) Technical Data

A trial was performed on a spent reforming catalyst coming from a Continuous Catalytic Reforming unit (CCR) and containing Platinum and Tin supported on a chlorided alumina. The laboratory study performed on this spent reforming catalyst lot of 12 tons has revealed a strong heterogeneity of carbon content within the catalyst (4 to 23% by weight). Furthermore the presence of shiny black particles characteristic from the presence of heel catalyst was highlighted. This 12 tons lot was regenerated via carbon burn-off in a rotolouvre furnace at an average of 525° C. Average flow rate was 300 kg/h. At the outlet of the furnace, a quantity of 11230 kg is recovered. Two populations of particles can be observed: a majority of grey or whitish beads and a minority of black shiny ones.

A colour sorting machine Sortex Z+ from SORTEX BUHLER (FIG. 1) has been used for the separation of the two populations. Flow rate was 40 kg/h. A quantity of 1820 kg of rejected material containing an average carbon content of 12.7 wt % by weight are separated from the accepted material (9410 kg) containing an average carbon content of 0.8 wt %. Rejected material consists of heel catalyst containing less than 2 wt % of grey particles. Accepted material consists of main regenerated catalyst containing less than 1 wt % of black particles.

Example 3

Method for Carbon Burn-Off Rate Optimization (a) General

A third concept of the invention deals with the regeneration of spent catalyst or adsorbent particles. Spent catalyst can originate from a refinery process or a petrochemical or chemical process. In most of the cases of spent products contaminated by coke, the content of coke is heterogeneous, The spent product is treated (regenerated) at a high rate so that a majority (more than 50%) of particles are well decoked, and then become white or light grey, while a minority are still dark grey or black. They correspond to the particles having initially the higher carbon content. The mixture is then separated in a colour sorting machine with the target of recycling the darkest particles in the regeneration zone.

According to this third concept, a depleted or spent catalyst, as defined above, or adsorbent whose particles, is intended to be treated in order to be regenerated or reactivated or rejuvenated.

Two main conventional standard regeneration methods may be used:
  (a) Operating with a low residence time with a high flow rate (for instance 300 kg/h). In that case the mixture of the treated particles generally contains a part of more or less black (or grey or dark or brown) particles containing more than 2 wt % of coke. The global carbon content of the lot can be around 0.5 or 0.8 wt %, which are usual specification for regenerated catalyst particles. However, the presence of, for instance, 5 or 10% by count, or more, of black (or dark grey or brownish) particles is an indication that the quality of the whole lot can be optimised, as these particles contain an appreciable amount of carbon and have a lower than expected performance.
  (b) Operating with a higher residence time with a low flow rate (for instance 150 kg/h). In that case the treated particles generally contain less than 1 or 2% of particles having a colour substantially different than white or light grey. Treatment is optimised in terms of product quality. But it is not in terms of economics as the treatment flow rate has been pretty low.

In-between methods could be used using various residence times i.e. various flow rates leading to more or less acceptable or unacceptable coke amount.

Our third concept is the following:

Instead of using the standard method (a) above consisting in the treating of the depleted catalyst or adsorbent with a high catalyst flow rate, leading to a portion of more or less black particles (this procedure being not fruitful, owing to the said too high level of the black particles), or instead of using the standard method (b) above consisting in the treating of the depleted catalyst or adsorbent with a low catalyst flow rate, leading to a pretty homogeneous treated product although being too slow on a industrial plant, the method according to the invention of our third concept will appear particularly fruitful, method wherein:
  (i) in a first step, the depleted or spent catalyst or adsorbent, that has been unloaded from a reaction zone or from an adsorption zone, is treated, (e.g. regenerated, rejuvenated or reactivated), at a high residence time, comprised for instance between 200 and 400 kg/h (e.g. 300 kg/h) leading to a mixture of catalyst or adsorbent particles whose a portion of these particles (for instance 1 to 15% by count) is more or less brown or grey or black, the average content of coke of these brown, grey or black particles being higher than 2 wt % (e.g. 4 to 8% by weight), and method wherein:
  (ii) in a second step, the mixture of the whole catalyst or adsorbent particles (including the grey or brown or black particles) is sent through a colour sorting machine.
  (iii) in a third step, obtaining at the outside of the machine, two streams of particles: (1) a first part of particles (rather white) whose coke average content is about less than 1 wt % or even less than 0.5 wt %. This first part of particles may be re-used such as it is in a refining process (as described above at the beginning of this example 3) or in an adsorption, i.e. this first part of particles is re-send in the said reaction zone or adsorption zone it had been unloaded from. (2) a second part of particles which consists of rather brown or grey or black particles and which is recycled towards the treating zone of the first step (i) above. In that way the black particles are given a chance to be later on re-used in a refining or petrochemical or chemical process or in an adsorption zone.

(b) Technical Data

A batch of 7.2 tons of spent zeolite containing catalyst (contaminated by 2.1 wt % by weight of carbon) was divided into 2 sub lots. Catalyst was shaped as extrudates and is essentially made of a zeolite type mordenite, additivated with 0.2 wt % Platinum, used in a paraffin Isomerization application.

The first half was treated according to the standard procedure:
  $1^{st}$ pass: 3.6 tons were treated in a calcination zone at 300 kg/h, leading to 3.4 tons of regenerated material containing around 10% by count of black particles. The carbon specification of 0.1 wt %, very low for this type of catalyst, was achieved. However, because of the presence of the high amount of coloured particles, a $2^{nd}$ pass is necessary. $2^{nd}$ pass was then carried out on the 3.4 tons above in the same operating conditions.

The whole treatment duration was around 23 hours.

The second half was treated using the colour sorting technology.
  $1^{st}$ pass: 3.6 tons were treated in the calcination zone leading to 3.4 tons of regenerated material containing around 10% of black particles, with a carbon content of less than 0.1 wt % carbon.
  In series with the first pass, regenerated material was sorted using the colour sorting machine at 300 kg/h. On one side of the machine, 2650 kg of good product was obtained, good meaning that the specification of carbon content (<0.1% wt) is achieved and that less than 1% by count of coloured particles are present. On the other side, 750 kg of a mixture containing around 40% by count of not fully regenerated coloured particles (carbon content about 0.3% wt) were isolated from the regenerated material.
  $2^{nd}$ pass was carried out on those 750 kg of recycled product from the sorting equipment in the same operating conditions to obtain full regenerated particles (<0.1% wt carbon).

The whole treatment duration was around 14 hours only for the thermal treatment and 11 hours for the sorting operation.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 07 290 822.1, filed Jun. 29, 2007 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising
   subjecting spent petroleum refining catalyst particles having surface layers of carbon with different thicknesses and having similar surface colors to an oxidative heat treatment to generate particles of different surface colors, and
   subjecting resulting mass of particles having different surface colors to a color sorting process to separate at least one type of heat treated catalyst particles based on their carbon content.

2. The process according to claim 1 including a treatment able to generate a difference in colour between two different particle populations and then an operation of colour sorting for segregate said two populations.

3. The process according to claim 1 wherein the particles undergo an oxidative heat treatment at 200-700° C. for regeneration of said particles.

4. The process according to claim 1 wherein said particles are different in their compositions and have the same size.

5. The process according to claim 1 comprising 2 flows of particles of different carbon contents, wherein the ratio of average carbon content of the flow of heat treated particles rich in carbon to average carbon content of the flow of heat treated particles poor in carbon is at least 2.

6. The process according to claim 5 wherein said ratio is at least 3.

7. The process according to claim 1 wherein one type of heat treated particles has an average carbon content of less than 1% wt, which can be re-used.

8. The process according to claim 7 wherein another type of heat treated particles has an average carbon content of more than 2% wt.

9. The process according to claim 8 wherein said type of particles with an average carbon content of more than 2% wt are recycled to regeneration.

10. The process according to claim 8 wherein said type of particles with an average carbon content of more than 2% wt are sent for metals recovery.

11. The process according to claim 7, the average carbon content being less than 0.5% wt.

12. The process according to claim 7 wherein said type of particles with an average carbon content of more than 1% wt are recycled to regeneration.

13. The process according to claim 1 wherein one type of heat treated particles has an average carbon content of more than 3% wt.

14. The process according to claim 13 wherein said type of particles with an average carbon content of more than 3% wt are separated and sent for metals recovery.

15. A process according to claim 1 further comprising:
    reusing a part of the color sorted particles and
    recycling a part of the color sorted particles to said oxidative heat treatment.

16. A process according to claim 15 wherein another part of the color sorted particles is separated and sent to metals recovery.

17. A process according to claim 1, wherein after separation the catalyst is suitable for regeneration.

* * * * *